UNITED STATES PATENT OFFICE.

DAVID E. COLE, OF MANAYUNK, PENNSYLVANIA.

IMPROVEMENT IN THE MANUFACTURE OF VINEGAR.

Specification forming part of Letters Patent No. 53,273, dated March 20, 1866.

*To all whom it may concern:*

Be it known that I, DAVID E. COLE, of Manayunk, Philadelphia, in the county of Philadelphia, in the State of Pennsylvania, have invented a new mode of manufacturing vinegar from the juice extracted from the tomatoes with a combination of sorghum-molasses and yeast; and I do hereby declare that the following is a full and exact description thereof.

To enable others to use my invention, I will describe its nature below.

Exact quantity of each ingredient combined to make forty gallons with a sufficient strength for table use or preserving, pickling, &c.: I put sixteen gallons of pure juice, after it has been well strained, in a forty-gallon cask and add two gallons of common West India molasses or sorghum to the tomato-juice, and also one quart of brewers' yeast, stir it thoroughly together, and then add twenty-one gallons of soft water, which will fill the cask. It then undergoes fermentation. I keep the cask full while undergoing fermentation, in order that it may throw out all sediment that remains in the cask, to be kept full with water to replace what runs out by fermentation. It is left to ferment for twelve days. Then it is racked off, the cask cleaned, and then the mixture is placed again in the cask and two gallons more of molasses added and one ounce of isinglass. It is then left to ferment the second time, and kept full while undergoing fermentation. I then let it remain thirty days, and rack off, when it will be perfectly clear and fit for use.

What I claim as my invention, and desire to secure by Letters Patent, is—

The converting of tomato-juice, with the combination of sorghum and yeast, rapidly into vinegar by its precise treatment.

DAVID E. COLE.

Witnesses:
JOHN P. THOMPSON,
LIZZIE A. LITTLEWOOD.